DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED SEPTEMBER 21, 1971

890 O.G. 981

T890,012

STABILIZATION OF POLYPHOSPHATE FLUID FERTILIZERS BY OXIDIZING AGENTS

Alva W. Frazier, 2219 Randolph St., Florence, Ala. 35630

Filed Dec. 23, 1970, Ser. No. 101,094
Int. Cl. C05b *7/00, 13/06*
U.S. Cl. 71—34
No Drawing. 14 Pages Specification

Very small quantities of ferrous iron, i.e., about 0.4 percent, can result in 20 to 25 percent sludge fraction in ammonium and potassium polyphosphate liquid fertilizers even after 1–2 weeks of storage, whereas ferric iron can attain concentrations up to 4.0 percent without the formation of sludge constituents. It has been discovered that treating the wet-process phosphoric acid with a very minor quantity (usually about 0.3 percent) of ammonium nitrate while the acid is warm (about 60° C.) will convert the iron to the ferric state and prevent the undesirable sludge formation of $Fe(NH_4,K)_2P_2O_7 \cdot 2H_2O$. Other nitrate sources which may be utilized as oxidizing agents are $NaNO_3$ or $KNO_3$.

Common oxidizing agents such as permanganates, dichromates, peroxides, chlorites, hypochlorites, and others are equally effective but are not as inexpensive and unique as ammonium nitrate which is not usually considered as an oxidizing agent. The requirement for this treatment and quantity of ammonium nitrate needed can be readily determined by a simple titration of the acid using a standardized potassium permanganate solution.